United States Patent [19]
Kiryu

[11] 3,907,322
[45] Sept. 23, 1975

[54] COLLAPSIBLE HAND TRUCK

[76] Inventor: Keizo Kiryu, 2-1 Hacchobori 4-chome, Chuo-ku, Tokyo, Japan

[22] Filed: July 8, 1974

[21] Appl. No.: 486,309

[52] U.S. Cl................................ 280/36 C; 280/47.23
[51] Int. Cl.² ............................................ B62B 1/04
[58] Field of Search.... 280/36 C, 36 R, 47.2, 47.23, 280/47.24, 47.27, 47.28

[56] References Cited
UNITED STATES PATENTS

| | | | |
|---|---|---|---|
| 2,479,467 | 8/1949 | Bryant | 280/47.27 |
| 3,112,042 | 11/1963 | Leshner | 280/47.2 |
| 3,726,536 | 4/1973 | Arino | 280/36 C |
| 3,788,659 | 1/1974 | Allen | 280/36 C |

Primary Examiner—Robert R. Song
Attorney, Agent, or Firm—George B. Oujevolk

[57] ABSTRACT

A collapsible hand truck comprising in combination a body defined by a pair of parallel support members with upper and lower ends, a pair of tubular handle members pivotally connected to said support members upper end, a scooping plate pivotally connected to the lower end of said support, and connecting means connecting said handle members and scooping plate including a pressing member to cause said scooping plate to pivot upwards, said handle members, to pivot downwards, and to collapse said hand truck into a small compact unit.

3 Claims, 5 Drawing Figures

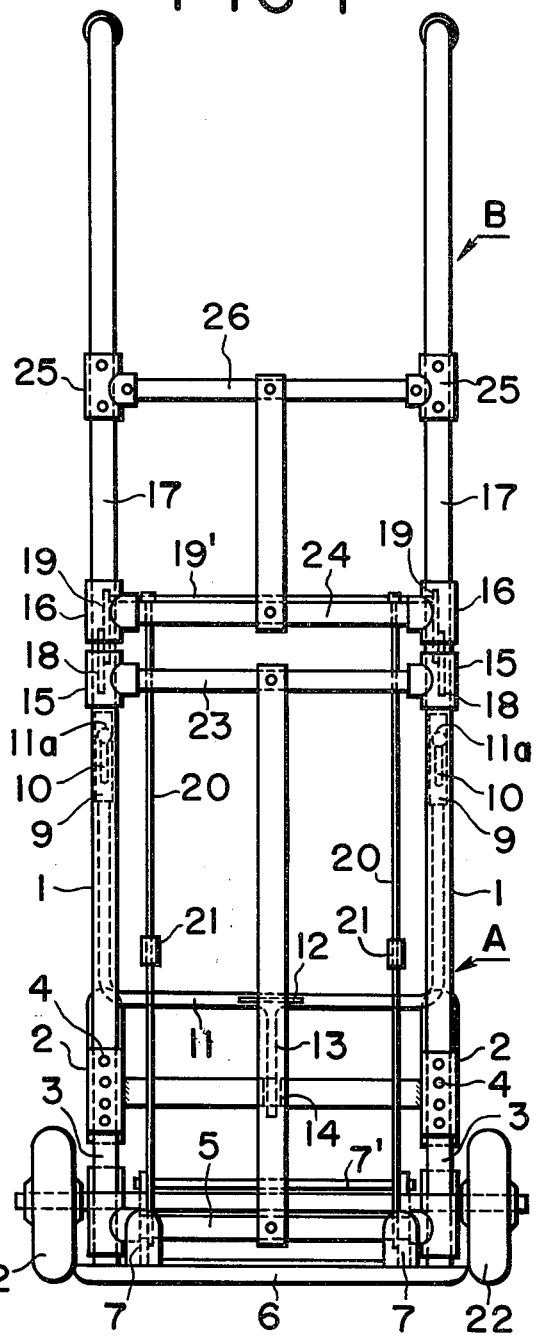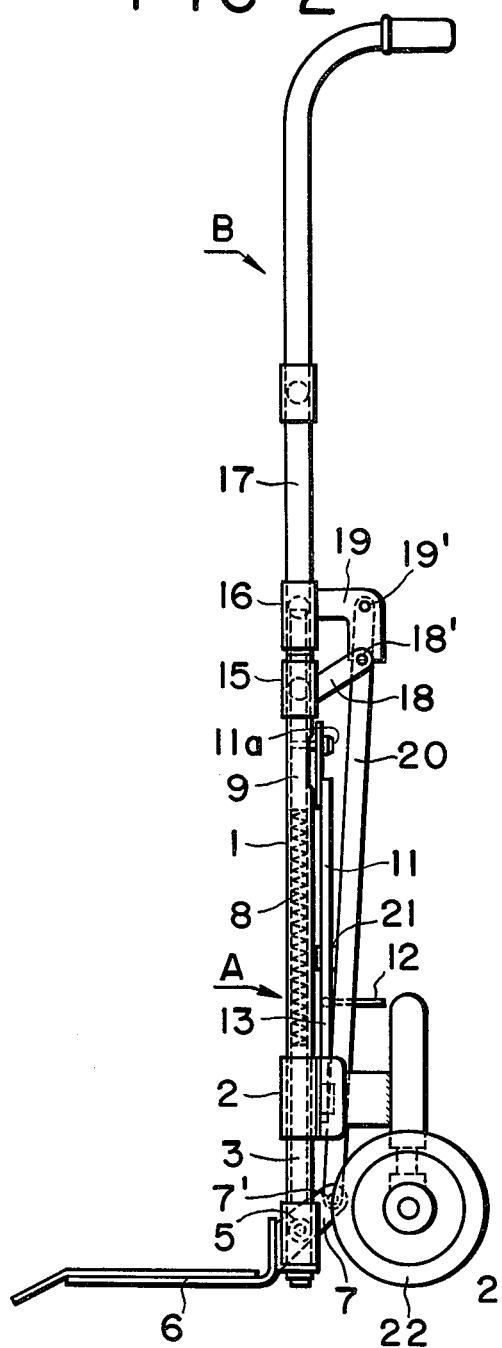

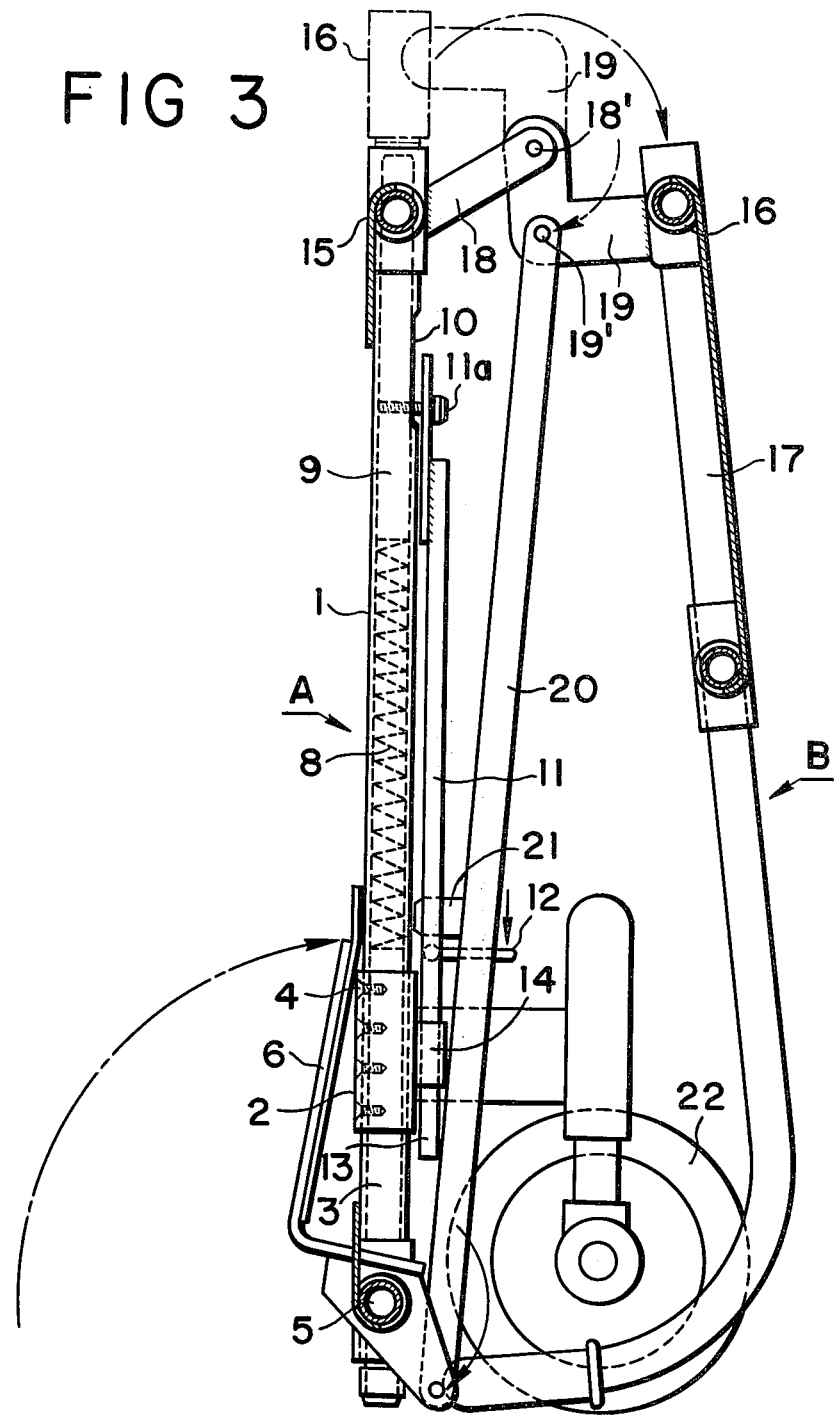

3,907,322

COLLAPSIBLE HAND TRUCK

BACKGROUND OF THE INVENTION

This invention relates to a collapsible hand truck, and more particularly to a collapsible packing case hand truck used on wharves to handle bales, cases, and boxes by longshoremen.

BRIEF DESCRIPTION OF THE PRIOR ART

The conventional type of small hand truck provided with only two wheels at the lower end is an incollapsible unit composed of a carriage body, handle bars and handles and a scooping plate, so that the vehicle is bulky and inconvenient to handle when it is to be stored after use or when it is to be transported from one place to another place for use.

OBJECTS OF THE INVENTION

The principal object of this invention is to provide a hand truck whose handles and scooping plate can be folded to the body at the same time but which can be used in the same way as an ordinary hand truck during service. While the hand truck of this invention is not in service, its handles and scooping plate are folded to the body in compact form, thereby eliminating the inconvenience of the conventional type of hand truck.

Another object of this invention to present a hand truck provided with a scooping plate which is mechanically interlocked with the handles for simultaneous collapsibility of the scooping plate and handles when the handles are folded toward the body, so as to save the labor required for folding the scooping plate. The hand truck of this invention is also of such construction that the handles are firmly joined to the body to prevent unstableness during the service.

The accompanying drawings represent an embodiment of the present invention, wherein:

BRIEF DESCRIPTION OF THE DRAWINGS

FIG. 1 is a front view of a hand truck as assembled;

FIG. 2 is a side view of the hand truck shown in FIG. 1;

FIG. 3 is an enlarged view of the longitudinal section at the middle of the hand truck as folded.

DETAILED DESCRIPTION OF THE INVENTION

Figure 4:
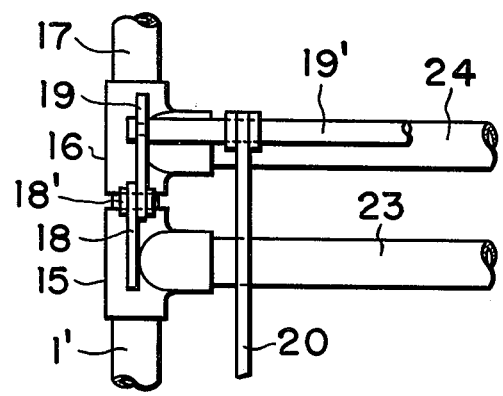
FIGS. 4 and 5 are enlarged back views of respective portions of the hand truck.
Figure 5:
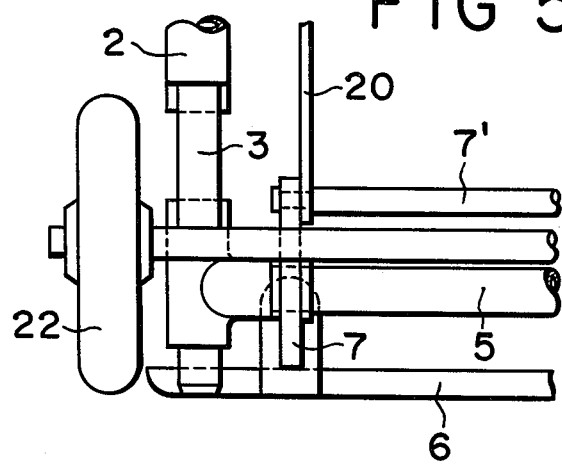

The invention will be described below in detail with reference to its embodiment illustrated in the drawings.

In FIG. 1, supports 3 for fitting the scooping plate are adjustably attached to the lower ends of supports 1 composed of metal pipes or the like through connecting pipes 2. The supports 3 are adjusted by the tightening or loosening of adjusting members 4 such as bolts. To the supports 3 for fitting the scooping plate is attached a fitting member 5, to which is fitted the scooping plate 6 rotatably by means of fitting arms 7.

The scooping plate 6 is shaped like a reverse L as shown in FIG. 2 when it is viewed from the side.

The supports 1 on right and left are connected at their upper parts to the connecting member 23 through first fitting pipes 15 and at their lower parts to the fitting member 5, respectively, to form the body A.

The supports 1 enclose springs 8 which have their lower ends supported by the upper end faces of the supports 3 and their upper ends contacting the lower end faces of connecting rods 9. Said connecting rods 9 are inserted slidably in the supports 1.

The supports 1 are provided with slots 10, through which the upper ends of pressing members 11 are fitted to the connecting rods 9 by means of screws 11a. The pressing members 11 are nearly U-shaped, and a pedal 12 is provided at the center of this U. Below the pedal 12 is provided a guide bar 13 branched from the pressing members 11, the guide bar 13 being fitted in and guided by a sleeve 14.

At the upper ends of the supports 1 are provided the first fitting pipes 15 as already described, and second fitting pipes 16 are further provided to face the first fitting pipes 15, respectively. To these second fitting pipes 16 are connected tubular handle members 17, which are connected to each other by a connecting member 24 through the fitting members 16 and also by another connecting member 26, provided above the connecting member 24, through joints 25 so as to form handles B.

To the first fitting pipes 15 are provided first arms 18, to the ends of which are connected pivotally movably on pivots 18' the ends of anglelike second arms 19 provided to the second fitting pipes 16 (refer to FIG. 4). To the corners of the second arms 19 are connected pivotally movably on pivots 7' to the ends of the fitting arms 7. The part shown with the symbol 21 in the drawings is a pressing click attached to each of the connecting rods 20. This pressing click 21 is designed to press the pedal 12 when the connecting rod 20 has descended. Wheels 22 are attached to the lower end on either side of the body A.

When the hand truck of this invention is to be used, the scooping plate 6 is set nearly at a right angle to the supports 1 and the handle members 17 are set on a line with the supports 1 as shown in FIGS. 1 and 2. In this state, the connecting rods 9 are inserted into the second fitting pipes 16 through the first fitting pipes 15, with the result that the handle members 17 are firmly maintained perpendicular to the supports 1. Just as in the case of an ordinary hand truck, the baggage may be placed on the scooping plate 6 and transported as rested against the body A composed of the supports 1.

After the hand truck has been used, the handles B and scooping plate 6 may be collapsed in the following way. First, step on the pedal 12 and press it down, and the pressing member 11 will be lowered as viewed in FIG. 1, and the connecting rods 9 will be extracted from the fitting pipes 16, thereby liberating the handle members 17. Then, rotate the handle members 17 clockwise as viewed in FIG. 2, and the arms 19 will be rotated clockwise on the pivots 18'. The arms 20 will be pushed by the pivots 19' and moved downward as viewed in FIG. 2. The fitting arms 7, therefore, will be rotated clockwise with the fitting member 5 as the axis as viewed in FIG. 3, and the scooping plate 6 will be drawn and folded toward the supports 1. Namely, the handles B will be folded toward the wheels 22 in the back of the body A, and at the same time the scooping plate 6 will be folded toward the front side of the body A.

To convert the hand truck of this invention from its folded state into its unfolded state ready for use, rotate the handles B counterclockwise as viewed in FIG. 3, and the respective members will act in directions reverse to those described above so that the hand truck will be assembled as shown in FIGS. 1 and 2.

As the hand truck designed according to this invention has a scooping plate capable of being folded or assembled simultaneously with the handles by an interlocking mechanism, the hand truck does not require a large space when it is stored after use or transported to another place. It is another advantage of this invention that the connection of the handles to the body by means of connecting rods gives the joints additional strength and makes the hand truck as a whole, very sturdy.

Although the most adequate mode of embodiment of the present invention has been described above with reference to the accompanying drawings, the construction of the hand truck is not restricted to this embodiment but may be variously modified in design as far as there is no deviation from the spirit of this invention.

I claim:

1. In a collapsible hand truck having:
   a. a body (A) defined by a pair of parallel support members (1) with upper and lower ends and wheels attached to said lower end on either side of said body;
   b. a pair of tubular handle members (17) pivotally connected to said support members upper end;
   c. a scooping plate (6) pivotally connected to the lower end of said support members; and
   d. connecting means connecting said handle members and scooping plate including a pressing member (11) connected to said connecting means to cause said scooping plate (6) to pivot upwards, said handle members (17) to pivot downwards, to collapse said hand truck into a small compact unit, the improvement in said hand truck wherein the support members (1) are tubular support members including therein springs (8) and connecting rods (9), forming part of said connecting means, said connecting rods (9) being capable of freely entering or emerging from the upper ends of the supports (1) and serving to receive the action of the springs (8) and to connect the supports (1) to the handle members (17) so that the body (A) is firmly connected to the handles by the insertion of the connecting rods (9) into both the supports (1) and the handle members (17).

2. A collapsible hand truck as claimed in claim 1, said connecting rods (9) being connected to said pressing member (11) including a pedal (21), so disposed that, when the pedal (21) is stepped on, the connecting rods (9) are lowered until they come out of the handle members (17) against the action of the springs (8) thereby disconnecting the body (A) from the handles.

3. A collapsible hand truck as claimed in claim 1 including the first arms (18) at the upper ends of the supports (1); angle-like second arms (19) at the lower ends of the handle members (17); fitting arms (7) connected to the scooping plate (6) rotatably disposed at the lower end of the body (A), the upper ends of said first arms (18) being connected pivotally movably to the lower ends of the second arms (19) and, connecting rods (20) connecting the corners of the second arms (19) to the ends of the fitting arms (7) so that, when the handles are rotated in the folding direction at the points where the first arms (18) are pivotally connected to the second arms (19), the scooping plate (6) is folded toward the front of the body (A) by the interlocking mechanism of the connecting rods (20) and fitting arms (7).

* * * * *